Oct. 11, 1960 W. A. KREWER ET AL 2,956,088
EXTRACTION PROCESS
Filed Dec. 27, 1957
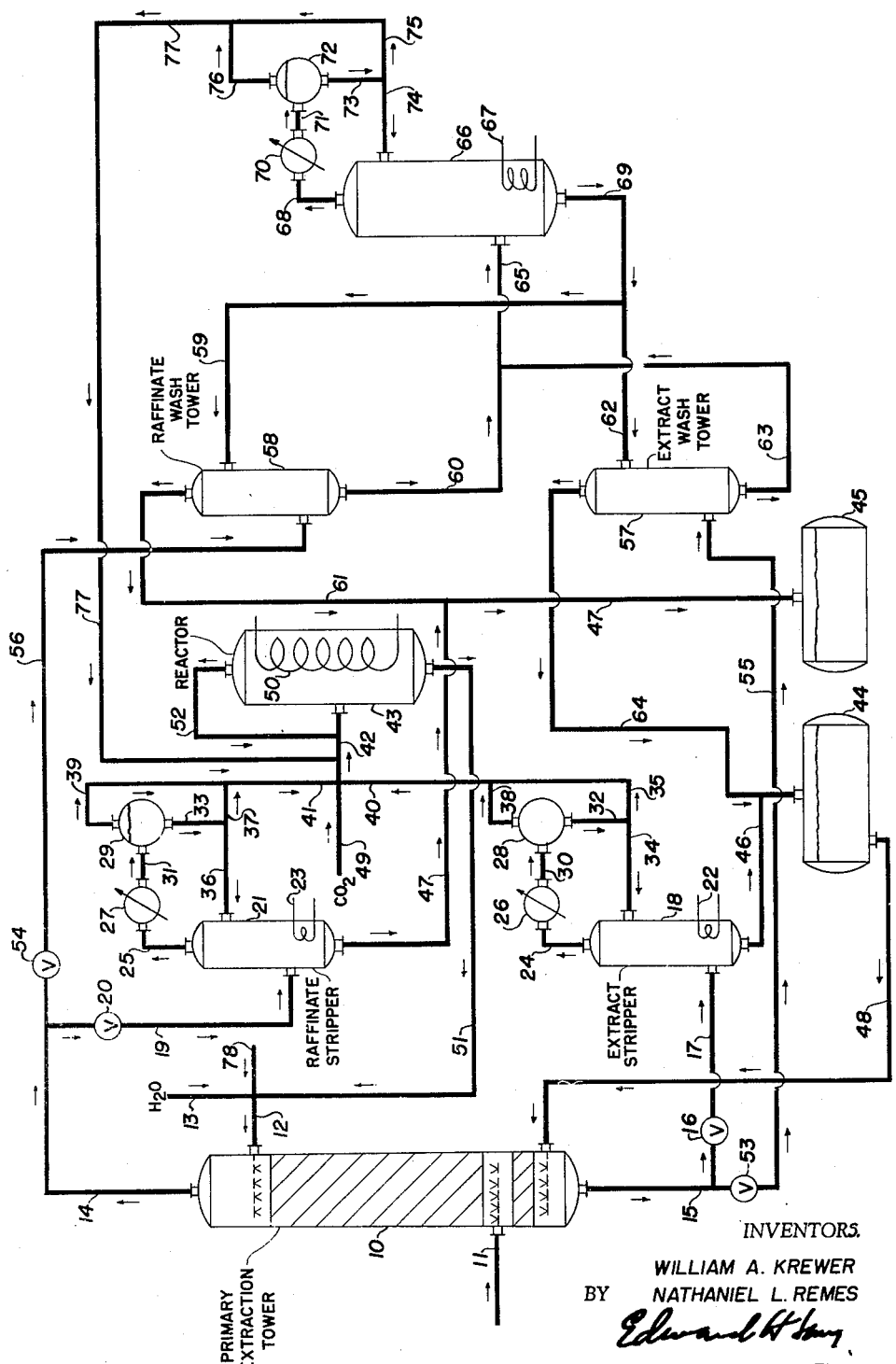
INVENTORS.
WILLIAM A. KREWER
BY NATHANIEL L. REMES
Edward H. Lang
ATTORNEY

United States Patent Office 2,956,088
Patented Oct. 11, 1960

2,956,088

EXTRACTION PROCESS

William A. Krewer, Arlington Heights, Ill., and Nathaniel L. Remes, Miami, Fla., assignors to The Pure Oil Company, Chicago, Ill., a corporation of Ohio Filed Dec. 27, 1957, Ser. No. 705,674

9 Claims. (Cl. 260—674)

This invention relates to a process for the recovery and purification of aromatic hydrocarbons and alkyl-substituted homologues thereof from hydrocarbon mixtures. More particularly, this invention relates to a solvent extraction process for the purification and recovery of aromatics employing methylethyl ammonium methylethyl carbamate as the selective solvent with a novel method of solvent recovery.

The use of selective solvents in the extraction of unsaturated hydrocarbons from hydrocarbon streams has developed to the point where a large selection of processes and solvent compositions is available for use. The difficulty in separating hydrocarbons having similar boiling points or other physical properties from hydrocarbon mixtures is well recognized. Highly complex fractional distillation processes, selective adsorption processes, azeotropic distillation processes and related processes have been developed for this purpose. This invention relates to solvent extraction processes and the use of a new solvent which has been found not only to exhibit particular effectiveness for separating aromatics from hydrocarbon mixtures, but which may be recovered from the extract or raffinate phases by distillation or heating, whereby a portion of the solvent is decomposed, followed by cooling of the vapors formed, whereupon the carbamate reforms and is recovered.

Accordingly, it becomes a primary object of this invention to provide an improved solvent extraction process and method of solvent recovery and rejuvenation.

Another object of the invention is to provide a process for extracting aromatic hydrocarbons from hydrocarbon mixtures.

Another object of the invention is to provide a process for extracting aromatics from hydrocarbon mixtures using methylethyl ammonium methylethyl carbamate as the selective solvent.

A further object of the invention is to provide a process for extracting aromatics, such as benzene and alkyl derivatives thereof, from hydrocarbon mixtures using methylethyl ammonium methylethyl carbamate in substantially anhydrous condition as the selective solvent.

Another object of the invention is to provide a process for the recovery of aromatics and alkyl-substituted homologues thereof from hydrocarbon mixtures containing same by extraction with methylethyl ammonium methylethyl carbamate using controlled amounts of water and employing a novel procedure for recovery of the solvent from the phases produced.

These and other objects of the invention will be described or become apparent as the details are evolved herein.

Free carbamic acid, 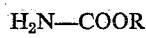, is not known but its salts, esters, and amides exist, according to P. Karrer "Organic Chemistry," 1943 edition, page 205. Ammonium carbamate is obtained by the action of dry carbon dioxide on dry ammonia to yield $H_2NCOONH_4$. An important series of derivatives of carbamic acid comprises its esters, which have the general formula $$H_2N—COOR$$

where R is an alkyl group. The ethyl ester is commonly called urethane. Urea is the amide of carbamic acid. This invention is concerned with methylethyl ammonium methylethyl carbamate, which has the formula:

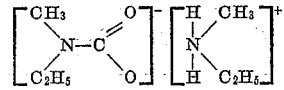

for use as a selective solvent for the separation of aromatics and alkyl-substituted homologues, including benzene, toluene, ethylbenzene and the isomeric xylenes from hydrocarbon mixtures. This compound or solvent may be prepared by the reaction of carbon dioxide and methylethyl amine in a solution of heptane or ether. The liquid carbamate separates at the end of the reaction as a lower liquid phase.

The invention is based on the discovery that although dimethyl ammonium dimethyl carbamate is a known solvent for certain impurities such as sulfur compounds in fuel oil fractions, as witnessed by United States Patent 2,594,044, there is a vast difference in the properties of the higher molecular-weight carbamate esters. It has been found that of all of the simple carbamates, only dimethyl ammonium dimethyl carbamate and methylethyl ammonium methylethyl carbamate are non-viscous liquids and are useful as such as selective solvents under economic conditions. Furthermore, it has been found that whereas dimethyl ammonium dimethyl carbamate is a more effective solvent when used with minor amounts of water, methylethyl ammonium methylethyl carbamate shows peak extraction efficiency when used under substantially anhydrous conditions, or with less than about 5.0% by volume of water. Moreover, it has been discovered that when a liquid hydrocarbon mixture containing aromatics is agitated with methylethyl ammonium methylethyl carbamate, either with up to about 5.0% by volume of water, or under anhydrous conditions, the aromatics are preferentially dissolved therein, forming a two-phase liquid system from which the solvent is readily recovered. The lower extract phase, containing the major portion of the carbamate solvent, may then be withdrawn and the carbamate solvent distilled off together with a small amount of a mixture of methylethyl amine and carbon dioxide, leaving an extract phase free of solvent. The raffinate phase may be similarly treated.

Further recovery of the carbamate solvent for re-use, and to prevent the build-up of aromatics therein, can be accomplished by distilling it from the extract or the raffinate, or both, and cooling the vapors at 0° to 10° C., in a common reactor whereupon any dissociated methylethyl ammonium methylethyl carbamate is reformed and again ready for use. Also, the carbamate solvent may be removed from the extract or raffinate phases by treatment with water, in which methylethyl ammonium methylethyl carbamate is soluble, to form aqueous solutions which are heated in a common still to a temperature of about 55° C. to 95° C., forming a vapor phase containing some methylethyl amine and carbon dioxide. This vapor phase, on condensation at 0° to 10° C., reforms any dissociated methylethyl ammonium methylethyl carbamate in substantially pure condition for re-use. In either of these methods of recovery, the addition of a small amount of carbon dioxide to the condensing material assures greater recovery of the carbamate solvent.

The invention will be demonstrated by reference to a number of experiments illustrating the foregoing techniques of extraction and carbamate solvent recovery.

Reference to the published literature and patents regarding the physical properties of carbamates reveals the information set forth in the table.

TABLE I

*Ammonium derivatives of N-substituted carbamates of the general formula*

$(R')_x(H)_yN-COONH_2(R'')_x(H)_y$

*where X is 1 or 2, Y is 1 or 0, and X+Y=2 as indicated*

| R' | R'' | M.P., °C. | B.P., °C. | Properties |
|---|---|---|---|---|
| methyl | methyl | 105 | | unstable, decomp. in $H_2O$. |
| ethyl | ethyl | 70 | decomp. | unstable, decomp. in air. |
| dimethyl | dimethyl | 0 | 60 | stable in air and $H_2O$. |
| diethyl | methyl | | | viscous, heavy oil. |
| Do | diethyl | 65 | | solid, decomp. on melting. |
| methyl ethyl | methyl ethyl | | 55 | stable in air and $H_2O$; liquid. |
| i-propyl | i-propyl | 80-81 | | unstable, decomposed. |
| n-propyl | n-propyl | 73-74 | | Do. |
| n-butyl | n-butyl | 81-82 | | Do. |
| n-heptyl | n-heptyl | 82-84 | | Do. |
| n-octyl | n-octyl | 84-86 | | Do. |
| glycol | glycol | | | not stable in air. |
| benzyl | benzyl | 100 | | solid. |
| ethylphenyl | ethylphenyl | 96-98 | | Do. |

From the information contained in Table I, it is apparent that dimethyl ammonium dimethyl carbamate and methylethyl ammonium methylethyl carbamate are the only derivatives which are stable liquids and the latter is, according to this invention, easily regenerated for re-use, as a selective solvent. The feature of recombination of the component parts, i.e., the amine and the carbon dioxide, to reform the carbamate constitutes one of the improvements of this invention.

In order to illustrate the foregoing embodiments and experiments, reference is made to the flow diagram. A charge material containing aromatic, such as a catalytic reformate, enters the bottom of extraction tower 10 by line 11, and passes countercurrently against methylethyl ammonium methylethyl carbamate solvent entering tower 10 via line 12 from the recovery system to be described. In accordance with this invention, methylethyl ammonium methylethyl carbamate is used either under anhydrous conditions or with up to about 5.0 volume percent of water present. Water, if used, is added at line 13 in controlled amounts. Tower 10 may be any form of liquid-liquid contactor designed to give intimate contact between the liquid phases therein. Although a countercurrent contactor is shown, the present process may be conducted using batch operation or co-current operation, and numerous means for providing extended contact surfaces may be employed, including Berl saddles, perforated or bubble-cap plates and the equivalents. Tower 10 is maintained at a temperature of about 5° to 50° C. and preferably at about 40° C. Pressures from atmospheric to about 10 p.s.i.g. may be used, 10 p.s.i.g. being preferred. Solvent-to-hydrocarbon feed ratios of between about 1.0/10 to 10.0/1.0 are used with about 3/1 being preferred.

A raffinate phase containing some solvent and the non-aromatic hyrocarbons is removed via line 14, and an extract phase containing the aromatic constituents is removed via line 15. The amount of solvent to be recovered from these two phases may vary, as is known in the art. Normally, the raffinate phase contains the least amount of solvent and the extract phase contains a predominance of solvent. Two methods of solvent recovery may be applied to the extract and raffinate phases. Ordinary water washing, followed by the distillation of the methylethyl ammonium methylethyl carbamate from the wash water and resynthesis of any decomposed carbamate, may be used and applied to both the raffinate and/or extract phases. Also, water-washing may be eliminated, and both phases may be treated separately to distill off the solvent and re-synthesize any vaporous decomposition products that may result. In both methods the solvent is freed of hydrocarbons and water for recycle to tower 10.

These procedures are illustrated in the flow diagram. Extract phase in line 15 passes through valve 16 and line 17 into the extract-stripper tower 18. Similarly, the raffinate phase passes through line 14, into branch line 19, and through valve 20 into raffinate-stripper tower 21. Heat is supplied to towers 18 and 21 by means of coils 22 and 23. In towers 18 and 21 the extract and raffinate phases are heated sufficiently to vaporize the methylethyl ammonium methylethyl carbamate, which leaves through lines 24 and 25. Under these conditions, the carbamate gradually breaks down into methylethyl amine and carbon dioxide to some extent. The resulting vaporous mixture is cooled, and the carabamate is condensed in coolers 26 and 27.

The resulting, mixed vapor-liquid streams are conducted to separators 28 and 29 through lines 30 and 31. Liquid methylethyl ammonium methylethyl carbamate is withdrawn from separators 28 and 29 through lines 32 and 33, which in turn are divided into branch lines 34, 35, 36, and 37, respectively. Branch lines 34 and 36 return some methylethyl ammonium methylethyl carbamate to towers 18 and 21 as reflux. The remaining portions of carbamate flow through branch lines to join methylethyl amine and carbon dioxide, flowing from separators 28 and 29 through lines 38 and 39, to form combined streams 40 and 41 which, in turn, join to form stream 42 flowing to reactor 43.

The denuded extract and raffinate are conducted from towers 18 and 21 to storage vessels 44 and 45, respectively, through lines 46 and 47. A portion of extract may be returned through line 48 to extraction tower 10 as reflux to improve aromatics purity and permit decreases in extraction tower size and solvent/feed ratio.

Stream 42, containing liquid methylethyl ammonium methylethyl carbamate, is combined with carbon dioxide entering through line 49, and flows to reactor 43, which is provided with cooling coil 50. In reactor 43, any decomposition products, viz., methylethyl amine and carbon dioxide, are combined to reform methylethyl ammonium methylethyl carbamate for recycle to extraction tower 10. This recombination forms carbamate in accordance with the reaction:

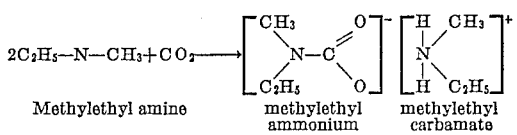

Methylethyl amine    methylethyl ammonium    methylethyl carbamate

This reaction takes place at below about 55° C. in reactor 43, and the dissociation reaction takes place to varying extents at temperatures above 55° C. in towers 18 and 21. The resulting purified and recombined methylethyl ammonium methylethyl carbamate is removed from reactor 43 via line 51 and is returned to tower 10. Unreacted amine and carbon dioxide are recycled to reactor 43 through lines 52 and 42.

As an alternative procedure, referred to supra, either the raffinate or extract streams, or both, may be water-washed to remove the solvent as a water solution which is then heated to distill the solvent, thereby producing some of the aforementioned amine and carbon dioxide, and separate it from the water. Accordingly, in this alternate procedure, all or part of either or both the extract and raffinate phases is conveyed through lines 15 and 14, through valves 53 and 54, and lines 55 and 56 to extract and raffinate water-wash towers 57 and 58. Valves 16 and 20 are closed.

In raffinate water-wash tower 58, the raffinate phase is countercurrently contacted with water entering through line 59. The solvent becomes preferentially dissolved in the water, and the water-solvent solution leaves through line 60. Solvent-free raffinate is withdrawn through line 61 to combine with stream 47 and flow to raffinate storage 45. Similarly, extract phase entering extract water-wash tower 57 through line 55 is countercurrently contacted with water entering via line 62, the solvent becomes preferentially dissolved in the water, and the water-solvent stream is withdrawn through line 63. Denuded extract is withdrawn through line 64 and combines with stream 46 to flow to extract storage 44. The solvent-water solutions in lines 60 and 63 are combined to form stream 65 and flow to distillation tower 66. In tower 66, the solution is heated by means of coil 67 sufficiently to vaporize the methylethyl ammonium methylethyl carbamate, which is withdrawn as overhead through line 68. As in towers 18 and 21, this distillation causes some dissociation of the solvent, minor in extent, to form methylethyl amine and carbon dioxide. These decomposition products are also taken overhead through line 68. Denuded water is withdrawn from the bottom of tower 66 through line 69 and is divided into streams 59 and 62 to return to wash-towers 57 and 58.

Overhead stream 68 from tower 66, containing methylethyl ammonium methylethyl carbamate, together with some methylethyl amine and carbon dioxide, is cooled in condenser 70 sufficiently to condense the carbamate. The vapor-liquid mixture then passes through line 71 to separator 72 wherein the liquid and vapor phases are separated. Liquid phase (carbamate) is withdrawn through line 73 and divided into streams 74 and 75, stream 74 returning to tower 66 as reflux. Stream 75 is combined with vapors from separator 72 flowing through line 76 to form stream 77 which is combined with stream 42 to flow to reactor 43 for reforming of the solvent, as previously described. Solvent losses are made up by introducing fresh solvent into the system at line 78.

In order to illustrate the process, the following examples are given:

EXAMPLE I

Two volumes of a hydrocarbon mixture containing 28% toluene (only aromatic hydrocarbon present in the mixture), and 72% paraffinic hydrocarbon, were agitated with one volume of methylethyl ammonium methylethyl carbamate at room temperature (about 27° C.). Upon standing, two liquid layers were formed. The extract layer (lower layer) was washed three times with 10-volume portions of water and the solvent-denuded hydrocarbon portion was found by analysis to contain 57.3% toluene. Thus, the hydrocarbon that was separated from the extract contained toluene in a concentration greater than double that of the original mixture.

EXAMPLE II

Catalytic reformate containing about 50 vol. percent of aromatics as hereinafter described is introduced via line 11 into tower 10 at a flow rate of about 100 gal./hr. Methylethyl ammonium methylethyl carbamate containing no water is introduced through line 12 at a rate of about 300 gal./hr. Tower 10 is maintained at a temperature of about 5 to 50° C. under atmospheric pressure. The solvent-to-charge ratio is about 1:1 to 20:1. A raffinate phase containing a small amount of solvent, in the order of 1.0 to 2.0% by volume, is taken off at line 14 through valve 54, and water-washed in raffinate wash-tower 58. For this purpose, water is introduced at about 27° C. through line 59. Tower 58 is maintained at about 20° to 35° C. and water-to-raffinate ratios of about 1:1 to 5:1 are maintained. The solvent-free raffinate, comprising a major portion of the paraffinic hydrocarbons and a minor portion of the paraffinic hydrocarbons from said reformate charge, is removed by line 61 and sent to storage 45. A water solution containing up to about 2 vol. percent of solvent is removed by line 60 and sent to still 66. Heat is applied by coil 67 to raise the temperature to about 95° C. (at atmospheric pressure) in still 66. This results in the release and partial decomposition of the solvent to form an overhead consisting of carbamate, methylethyl amine and carbon dioxide, which passes into line 68. Conditions in still 66 are maintained so as to avoid carry-over of any water vapor. This overhead stream may be dehydrated to insure this result. A bottoms fraction comprising substantially pure water is removed from still 66 at line 69 and recycled through line 59 to wash tower 58. Any excessive build-up of water in the system is prevented by removal of part of this stream.

Extraction in tower 10 at the conditions described results in the production of an extract phase which consists of methylethyl ammonium methylethyl carbamate, a major portion of the aromatic hydrocarbons from the feed, and a minor portion of the non-aromatic hydrocarbons from the feed. This stream is withdrawn through line 15, and passed through valve 16 and line 17 into extract-stripper tower 18. Coil 22 supplies heat to raise the temperature of the extract phase to about 60 to 75° C., while the tower is maintained at atmospheric pressure. This results in a solvent-denuded extract which is removed to storage 44 through line 46. Extract, in an amount equivalent to 0.25–3.0 volumes/volume of feed, is withdrawn from extract storage 44 and returned to tower 10 as extraction reflux via line 48.

The vaporous mixture of methylethyl ammonium methylethyl carbamate, methylethyl amine and carbon dioxide is withdrawn from tower 18 through line 24, partial condenser 26, and line 30 to separator 28 from which a portion of the condensed carbamate is returned to tower 18 as distillation overhead reflux. The remainder of the carbamate and all of the amine and carbon dioxide are recombined and join with the liquid-vapor stream 77 from still 66, along with a sufficient amount of carbon dioxide introduced at line 49 to form a reaction mixture containing at least about 1.0% excess carbon dioxide over the stoichiometric amount necessary to combine with the amine to reform carbamate. This mixture passes at a rate of about 300–350 gal./hour into reactor 43. The reactor is maintained at about 5° to 50° C. by means of coil 50, and liquid methylethyl ammonium methylethyl carbamate is withdrawn at line 51 for re-use in tower 10. Only traces of unreacted methylethyl amine and carbon dioxide are recycled via lines 52 and 42.

EXAMPLE III

The procedure of Example II is repeated except that valve 54 is closed and valve 20 opened so that the raffinate phase is stripped free of solvent by heating in tower 21. A portion of the solvent decomposes during this stripping operation, as happens in the extract-stripper tower 18. The condensed carbamate and vaporous amine and carbon dioxide in stream 41 pass to reactor 43 wherein the amine and carbon dioxide are recombined as previously described. The raffinate stripper is operated at atmospheric pressure, and the raffinate is heated to about 65 to 70° C. to distill off the carbamate.

This particular procedure is useful only when the initial boiling point of the feedstock is substantially greater than the boiling point of the solvent. If such is not the case, the raffinate must be freed of solvent by water washing.

EXAMPLE IV

In this example the procedures of Examples I and II are repeated except that in addition to closing valve 54 to process the reffinate in accordance with Example II, valve 16 is also closed and the extract phase is passed through line 55 and valve 53 into extract wash-tower 57, maintained at about 20° to 35° C. Water at a temperature of about 27° C. is introduced at line 62. The denuded extract is taken overhead through line 64 to storage 44 and the resulting water solution in line 63 is processed in still 66 at a temperature of about 95° C. as described in Example I.

EXAMPLE V

In this preferred embodiment both raffinate and extract phases from tower 10 are sent to their respective washtowers, 58 and 57, wherein they are processed in accordance with the procedures described in Examples II and IV. The combined water-wash streams are heated in still 66, resulting in a combined stream of methylethyl amine, carbon dioxide, and methylethyl ammonium methylethyl carbamate in line 77, which is sent to reactor 43 and processed in accordance with Examples II or III.

EXAMPLE VI

In a further complete specific embodiment of the instant process, 1000 BPD of a feed containing 100 BPD of benzene, 300 BPD of toluene and 600 BPD of hexanes, heptanes and octanes are charged to extraction tower 10. Operating conditions in the major vessels, and stream compositions are as follows:

| | Value |
|---|---|
| Solvent/feed ratio in tower 10 | 2/1 |
| Stages in tower 10 | 5 |
| Reflux ratio in tower 10, (stream 48) | 0.50 |
| Temperature of tower 10 ° C. | 25 |
| Pressure in tower 10 p.s.i.g. | 0 |
| Composition of stream 14: | |
|    Percent solvent | 1 |
|    Percent paraffin | 85 |
|    Percent aromatics | 14 |
| Composition of stream 15: | |
|    Percent solvent | 38.2 |
|    Percent paraffins | 4.8 |
|    Percent aromatics | 57 |
| Percent water in solvent (stream 12) | 1.0 |
| Overhead temp. of towers 18 and 21 ° C. | 55 |
| Bottom temp. of towers 18 and 21 ° C. | 90 |
| Composition of stream 24: | |
|    Percent carbamate | 95 |
|    Percent $CO_2$ | 1.36 |
|    Percent $CH_3NHC_2H_5$ | 3.64 |
| Composition of stream 25: | |
|    Percent carbamate | 95 |
|    Percent $CO_2$ | 1.36 |
|    Percent $CH_3NHC_2H_5$ | 3.64 |
| Composition of stream 42: | |
|    Percent carbamate | 95 |
|    Percent $CO_2$ | 1.37 |
|    Percent $CH_3NHC_2H_5$ | 3.63 |
| Temperature in Reactor 43 ° C. | 25 |
| Composition of stream 51: | |
|    Percent carbamate | 100 |
| Composition of stream 68: | |
|    Percent carbamate | 95 |
|    Percent $CO_2$ | 1.36 |
|    Percent $CH_3NHC_2H_5$ | 3.64 |

| | Paraffins | Aromatics | Solvent |
|---|---|---|---|
| Composition of extract (44), BPD | 48 | 352 | 0 |
| Composition of raffinate (45) | 540 | 60 | 0 |

| | |
|---|---|
| Aromatics purity percent | 88 |
| Paraffins purity do | 90 |

The foregoing examples illustrate the high degree of aromatics recovery and solvent separation from both the extract and raffinate phases in accordance with this invention. The small amount of decomposition and resynthesis of the methylethyl ammonium methylethyl carbamate takes place almost quantitatively with very little loss through competing reactions. In place of the water, other polar or semi-polar solvents may be used. Suitable non-limiting examples are methyl alcohol and tetrahydrofurane. The polar auxiliary solvent or antisolvent used improves the selectivity without greatly reducing the capacity provided the auxiliary solvent has a boiling point lower than the aromatic being extracted. Concentrations of these auxiliary solvents, including water, should not exceed about 5% by volume.

The process of this invention is carried out in accordance with known methods in the extraction industry with the modifications herein asserted. Any liquid-liquid or liquid-vapor contact method effective in solvent extraction processes may be used. The feed may be treated in one tower or a series of towers, and with one or more successive portions of the carbamate solvent. The portions of solvent used in each successive treatment may vary in accordance with the extent of extraction sought. The process may be batch-wise or continuous, and countercurrent flow in a vertical tower is preferred.

Although solvent-to-feed ratios of about 1/1 to 10/1 are usually most practical in the process of this invention, higher ratios up to about 20:1 may be used, depending on the type of feed to be treated, the efficiency of the extraction method used, and the extent of extraction desired. The temperature of the extraction process is also subject to variation depending on the foregoing considerations as to solvent ratios and the chemical and physical characteristics of the carbamate solvent. Temperatures ranging from below ambient temperatures up to the boiling point of the solvent or to the lowest-boiling constituent of the feed stock may be used. Higher temperatures may be used with the application of pressure to maintain the solvent and feed in the liquid phase.

Where anhydrous or substantially anhydrous conditions are claimed or described in this specification, it is meant that the water content of the solvent phase is maintained as low as possible. Since most feed materials will contain some water, steps should be taken to prevent water from accumulating in the system. This can be accomplished by withdrawing a portion of the water in line 69 for disposal, when water-washing is used, and by phase separation from the extract and raffinate storage tanks when stripping is used. In either case, the solvent distilled overhead from tower 66, or towers 21 and 18, will be substantially free of water, and water will not accumulate in the solvent system. In addition to depreciating the selectity and capacity of the solvent, amounts of water above about 5% by volume may result in emulsification difficulties.

The process of this invention is applicable to the treatment of any type of hydrocarbon mixture from which economical amounts of aromatics, including benzene and alkyl homologues thereof, can be recovered. Such mixtures include products obtained from aromatization and similar reactions. The products obtained from catalytic reforming, hydrocracking and dehydrocyclization processes may be used as feed for the present process. Any mixtures containing a paraffinic- or naphthenic-type hydrocarbon admixture with aromatics such as benzene, toluene, xylenes, mesitylene, methyl naphthalene, and ethyl benzene, as simple or complex multi-component mixtures, may be used as the starting material. Aromatics may be removed from such feed materials as petroleum distillates, naphthas, gasoline, kerosene, fuel oil fractions, and gas-oil fractions, but the aromatic content of virgin fractions usually is too low to permit economic extraction merely for the sake of obtaining pure aromatics. The charge material should be liquid at ordinary temperatures and not subject to decomposition at the extraction temperatures or to reaction with the selective solvent used herein. One suitable charge oil is the class of products known in the art as catalytic reformates. These liquid products contain relatively high concentrations of desirable aromatic hydrocarbons. Catalytic reformates are obtained by treating naphthas to reforming, dehydrogenation, hydrocracking and dehydrocyclization reactions at temperatures ranging from 850° F. to about 1000° F. with pressures up to 500 p.s.i.g. in the presence of a metal-containing catalyst.

As a more specific illustration, catalytic reformates obtained as a result of the treatment of a virgin naphtha boiling at 175° F.–400° F. (API gravity 50° to 60°) with a platinum-alumina catalyst at 875° F. to 975° F. and pressures ranging from 200 to 500 p.s.i.g. may be used. Reformates so produced contain from about 30 to 55 vol. percent of aromatics and constitute a preferred feed for the present process. For example, reformates produced by reforming a 200°–400° F. virgin naphtha at about 930° F. and 325 p.s.i.g., in the presence of a catalyst comprising about 0.1 wt. percent of platinum on an alumina base, are representative. In general, these reformates have a boiling range of about 125° to 400° F., an API gravity of 40° to 50°, and an aromatic content of 45–55 volume percent. A particularly suitable reformate is obtained by subjecting a charge naphtha having a boiling range of 178° F. to 389° F., an API gravity of 59.1°, a RON, clear, of 44.6, a RON+0.3 TEL of 71.4 and containing 0.01% sulfur, about 91.0 vol. percent of paraffins and naphthenes, 1.0 vol. percent olefins, and 8.0 vol. percent aromatics, to reforming at about 930° F., to produce a product having an API gravity of 49.2°, an IBP of 128° F., an EBP of 405° F., a RON, clear, of 89.4, a RON +3cc. TEL of 98.2, and containing about 48.0 vol. percent paraffins and naphthenes, 1.0 vol. percent olefins and 51.0 vol. percent of aromatics. By precise fractionation and blending to different octane numbers, it was determined that this reformate feed material exhibited the following analysis:

TABLE II

*Aromatics in reformate feed*

| Aromatic: | Vol. percent |
|---|---|
| Benzene | 4.19 |
| Toluene | 13.1 |
| Mixed xylene and ethyl benzene | 16.51 |
| $C_9$ and heavier aromatics | 17.2 |

Examples of the composition of other reformate feed hydrocarbons that may be used are shown in Table III giving the volume percent of aromatics in each, and the research octane level to which the reforming reaction was directed in each instance.

TABLE III

*Aromatics Distribution In Various Reformates[1] (Volume Percent)*

| Aromatic | 85 Research Octane Level | 95 Research Octane Level |
|---|---|---|
| Benzene | 2.96 | 3.41 |
| Toluene | 9.64 | 12.9 |
| Ethyl-benzene | 2.55 | 2.72 |
| p-xylene | 2.74 | 2.83 |
| m-xylene | 6.45 | 6.73 |
| O-xylene | 3.96 | 3.81 |
| $C_9$ and heavier aromatics | 17.3 | 22.4 |
| Total | 45.6 | 54.8 |

[1] These reformate products were from different feed stocks.

In general, these feed stocks contain a mixture in various proportions of i-butane, n-butane, i-pentane, n-pentane, cyclopentane, 2,2-dimethylbutane, 2,3-dimethylbutane, 2-methylpentane, 3-methylpentane, n-hexane, methylcyclopentane, 2,2-dimethylpentane, benzene, 2,4-dimethylpentane, cyclohexane, 2,2,3-trimethylbutane, 3, 3-dimethylpentane, 1,1-dimethylcyclopentane, 2,3-dimethylpentane, 2-methylhexane, cis-1,3-dimethylcyclopentane, trans-1,2-dimethyl cyclopentane, 3-ethylpentane, n-heptane, 2,2,4-trimethylpentane, cis-1,2-dimethylpentane, methylcyclohexane, methylethylcyclopentane and other $C_8$ hydrocarbons, toluene, ethylbenzene, p-xylene, o-xylene and m-xylene. These represent the types of hydrocarbon mixtures from which the aromatics, as enumerated, can be separated by the present process. In using reformates as feed hydrocarbons, one purpose is to separate the low-octane components so that they may be recycled or otherwise upgraded in octane number, and the high-octane products recovered for gasoline blending.

Another type of feed mixture comprises various fractions and mixtures of fractions of reformates which may be used in this invention. For example, a reformate or other source of aromatics may be fractionated to form a benzene concentrate, a toluene concentrate and a xylene concentrate; these may be individually treated or mixed in various proportions and treated to solvent extraction in accordance with this invention to obtain products having a high concentration of the desired aromatic. One such feed material comprises a synthetic mixture of 1 part benzene concentrate, 2 parts toluene concentrate and 1 part xylene concentrate. The purpose of treating such concentrates is to recover aromatics of maximum purity for use as organic intermediates, solvents, etc.

Although, in accordance with the description of the process of this invention, the overhead from strippers 18 and 21 has been condensed in separate condensers 30 and 31, the process may be carried out by using a common condenser for the strippers and a common separator. Other modifications of the process will become apparent to one skilled in the art without departing from the spirit of the invention, the claims of which represent the only limitations therein.

What is claimed is:

1. The process for the recovery of aromatic hydrocarbons and alkyl-substituted homologues thereof from hydrocarbon mixtures containing same which comprises contacting said hydrocarbon mixtures with methylethyl ammonium methylethyl carbamate containing about 1.0 to 5.0 volume percent of water in an extracting treatment, separating the composite mixture into two component parts consisting of a raffinate phase and an extract phase, heating said phases separately to a temperature sufficient to distill and partially decompose said solvent into methylethyl amine and carbon dioxide, separating said solvent decomposition products from the respective raffinate and extract phases, combining said decomposition products, cooling said combined decomposition products in the presence of at least a stoichiometric amount of carbon dioxide to reform said methylethyl ammonium methylethyl carbamate, and separating said reformed solvent therefrom for recycle to said extracting treatment.

2. The process in accordance with claim 1 in which said cooling step is conducted by maintaining said decomposition products in contact with additional carbon dioxide in a separate reaction zone maintained at a temperature below about 55° C.

3. The process in accordance with claim 1 in which said aromatic hydrocarbons are selected from the group of benzene, toluene, ethylbenzene, o-xylene, m-xylene, p-xylene and their mixtures.

4. The process in accordance with claim 1 in which said hydrocarbon mixture comprises a catalytic reformate having a boiling range of about 100° to 450° F.

5. The process in accordance with claim 2 in which a stoichiometric excess of carbon dioxide is maintained in said reaction zone and excess carbon dioxide over that reacted is continuously recovered from the reaction products and recycled to said reaction zone.

6. The process in accordance with claim 1 in which said extracting treatment is conducted at a temperature of about 5° to 50° C. and solvent-to-hydrocarbon ratios of between about 1:1 to 10:1 are used.

7. The process of separating aromatic hydrocarbons from paraffinic hydrocarbon mixtures containing same which comprises contacting said hydrocarbon mixtures with methylethyl ammonium methylethyl carbamate as the solvent in an extracting treatment under conditions whereby the composite mixture separates into a paraffinic raffinate phase and an aromatic extract phase, separately washing said raffinate and extract phases with water to recover solvent-free raffinate and extract therefrom, recovering said aromatic hydrocarbons from said extract phase, combining the water-wash phases from said washing step, subjecting said combined water-wash phases to heating to recover an overhead comprising said solvent and a small portion of methylethyl amine and carbon-dioxide decomposition products, subjecting said overhead to contact with additional carbon dioxide in a separate reaction zone maintained at below about 55° C. for a period of time sufficient to reform methylethyl ammonium methylethyl carbamate therefrom, and recycling said reformed solvent and recovered solvent to said extracting treatment.

8. The process in accordance with claim 7 in which said hydrocarbon mixture comprises a catalytic reformate having a boiling range of about 100° to 450° F.

9. The process in accordance with claim 7 in which said methylethyl ammonium methylethyl carbamate contains from about 1.0 to 5.0 volume percent of water.

References Cited in the file of this patent

UNITED STATES PATENTS

| | | |
|---|---|---|
| 2,594,044 | Loder | Apr. 22, 1952 |
| 2,635,124 | Hunter et al. | Apr. 14, 1953 |